(12) United States Patent
Nozaki

(10) Patent No.: US 8,310,742 B2
(45) Date of Patent: Nov. 13, 2012

(54) IMAGE READING APPARATUS

(75) Inventor: Mitsuhiro Nozaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 429 days.

(21) Appl. No.: 12/721,556

(22) Filed: Mar. 10, 2010

(65) Prior Publication Data

US 2010/0231983 A1    Sep. 16, 2010

(30) Foreign Application Priority Data

Mar. 11, 2009    (JP) ................................. 2009-058069

(51) Int. Cl.
*H04N 1/04*    (2006.01)

(52) U.S. Cl. ......... 358/514; 358/412; 358/474; 358/475

(58) Field of Classification Search .................. 358/514, 358/412, 474, 475, 426.01

See application file for complete search history.

(56) References Cited

U.S. PATENT DOCUMENTS 6,037,584 A * 3/2000 Johnson et al. ............... 250/235
6,914,400 B2 * 7/2005 Herwald et al. .............. 318/466

FOREIGN PATENT DOCUMENTS

| JP | H08-228267 A | 9/1996 |
| JP | 2002-135543 A | 5/2002 |
| JP | 2007-267187 A | 10/2007 |

* cited by examiner

*Primary Examiner* — Houshang Safaipour
(74) *Attorney, Agent, or Firm* — Baker Botts L.L.P.

(57) ABSTRACT

An apparatus includes: a reading unit performing a reading operation whenever a line start signal is input thereto; a transport unit transporting anyone of the reading unit and the reading target document; an encoder outputting an encoder signal whenever a transport target is moved by a predetermined distance; a control unit transmitting the line start signal to the reading unit; a time measuring unit measuring a time elapsed from a time point when the line start signal was last transmitted; a cycle measuring unit measuring an output time interval of the encoder signal, as an encoder cycle; and a storage unit storing the latest encoder cycle, wherein the control unit transmits the line start signal to the reading unit whenever the elapsed time is equal to or greater than a time obtained by multiplying a value of the encoder cycle by a correction coefficient determined by a ratio R2/R1.

5 Claims, 14 Drawing Sheets

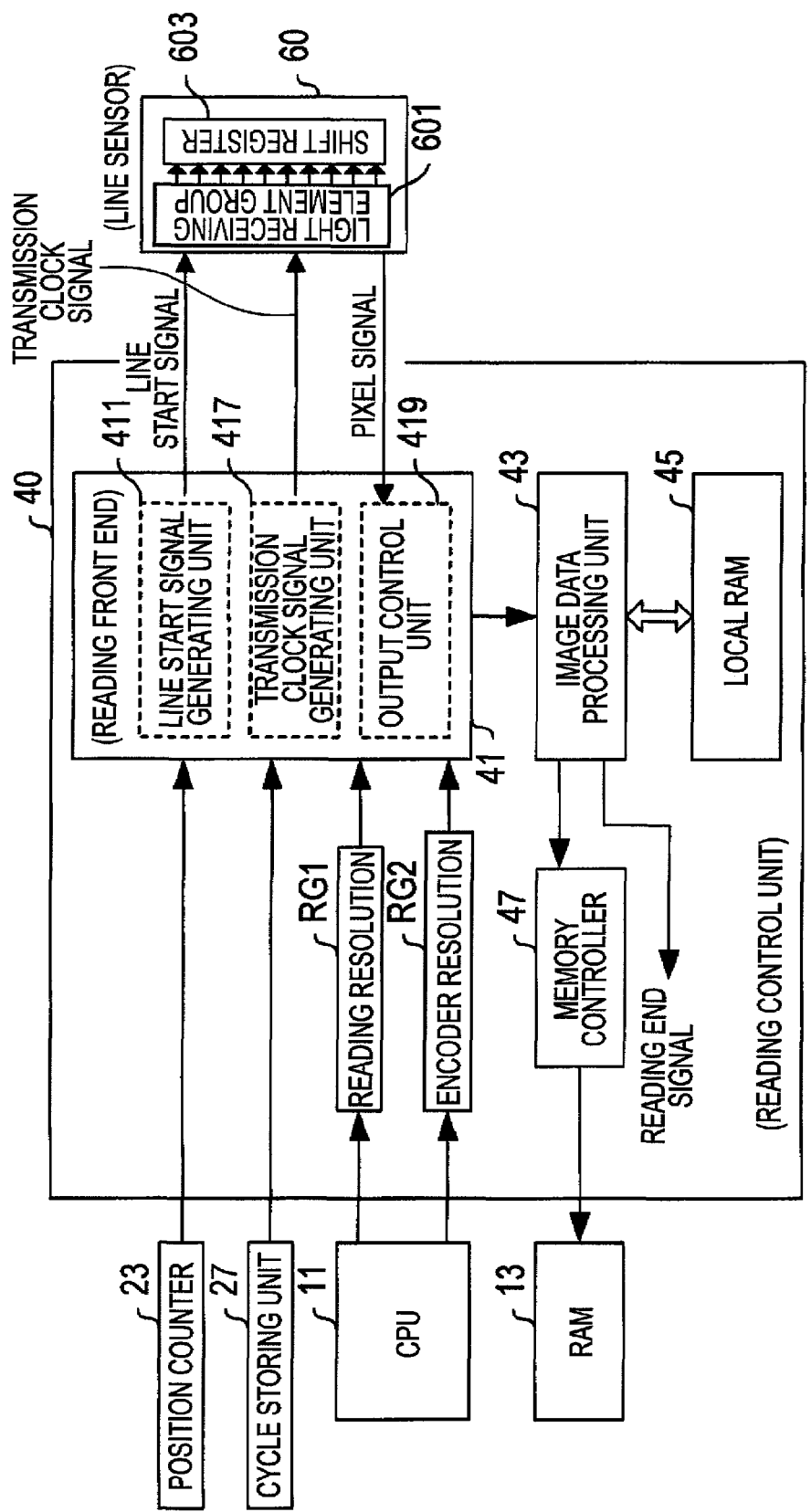

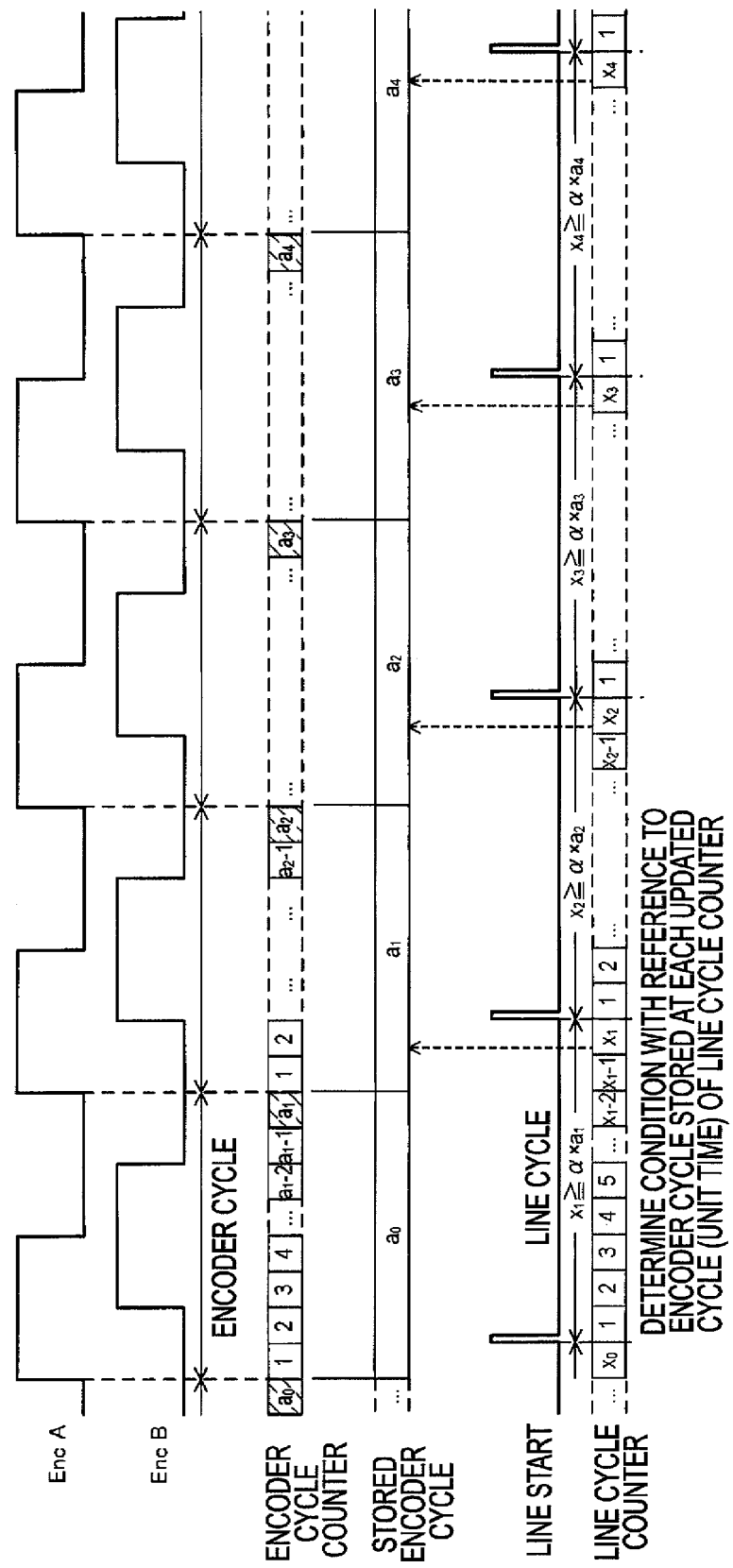

IMAGE READING APPARATUS

CROSS REFERENCE TO RELATED APPLICATION

The present application claims priority from Japanese Patent Application No. 2009-058069, which was filed on Mar. 11, 2009, the disclosure of which is herein incorporated by reference in its entirety.

TECHNICAL FIELD

The apparatuses and devices consistent with the present invention relate to an image reading apparatus that reads a reading target document line by line and generates image data representing the reading result.

BACKGROUND

A related art image reading apparatus is provided. In the related art image reading apparatus, a line start signal designating the reading start time of a line image is input to a line sensor at a predetermined cycle, the line sensor or document is moved at a constant velocity, a line image data of each line is generated, and the read image data representing the read image of the whole document is generated.

A related art flatbed-type image reading apparatus has been also known, in which a reading pulse (line start signal) is input to a line sensor at a time interval corresponding to the movement time of the line sensor as the distance of one line, and line image data for each line are generated.

Further, an related art image reading apparatus has been also known, which outputs a time signal (line start signal) to an image sensor on the basis of a signal output from an encoder unit detecting the rotation amount of a motor driving a carriage on which the image sensor is mounted.

SUMMARY

However, in the related art apparatus described above, there are the following disadvantages. For example, according to the related art apparatus that inputs the line start signal to the line sensor at a regular cycle, the line sensor or the document is transported at a constant velocity, and it is necessary to read the document line by line at the same distance and interval. However, it is technically difficult to transport the line sensor or the document at a constant velocity without errors. Therefore, in the related art, there is a concern that deviation occurs in the line interval of the reading operation for each line due to variations in velocity of the transport target, and satisfactory image quality cannot be obtained when the line image data are combined to represent the read image of the whole document.

On the other hand, according to the related art apparatus that generates the input signal (line start signal) to the line sensor on the basis of the signal output from the encoder, the influence of variation in velocity of the transport target is suppressed. However, in the related art, an edge of the pulse signal output from the encoder is detected, and the line start signal is merely input to the line sensor by synchronizing with the edge. Accordingly, there is a concern that it is necessary to match the encoder resolution (i.e., the number of pulses output from the encoder while the transport target is moved by a unit distance) to the target reading resolution.

The invention has been made in consideration of such concerns, and an object of the invention is to improve a degree of freedom in design of an apparatus in an image reading apparatus which inputs a line start signal to a reading unit, corresponding to the velocity of the transport target.

To achieve such an object, according to an illustrative aspect of the invention, there is provided an image reading apparatus including a reading unit that performs a reading operation whenever a line start signal is input thereto, to read a document of a reading target line by line in a main scanning direction; a transport unit that transports any one of the reading unit and the reading target as a transport target in a sub-scanning direction; an encoder that outputs an encoder signal whenever the transport target is moved by a predetermined distance; a control unit that transmits the line start signal to the reading unit; a time measuring unit that measures the time elapsed from a time point when the line start signal is last transmitted; a cycle measuring unit that measures the output time interval of the encoder signal output from the encoder, as an encoder cycle; and a storage unit that stores the latest encoder cycle measured by the cycle measuring unit.

In the image reading apparatus, the control unit transmits the line start signal to the reading unit whenever the elapsed time measured by the time measuring unit is equal to or greater than the time obtained by multiplying the encoder cycle stored in the storage unit by a preset correction coefficient. The control unit uses the correction coefficient determined by a ratio $R2/R1$ of a reading resolution $R1$ that is the number of reading lines per unit length in the sub-scanning direction of a target and an encoder resolution $R2$ that is the number of outputs of encoder signals per unit length in the sub-scanning direction corresponding to a reciprocal of the predetermined distance.

When the velocity of the transport target is V, the encoder cycle can be calculated by the following formula.

$$\text{Encoder Cycle} = (1/R2) \times (1/V)$$

The line cycle (output time interval of line start signal) to achieve the reading resolution $R1$ can be calculated by the following formula.

$$\text{Line Cycle} = (1/R1) \times (1/V)$$

Accordingly, the line cycle to achieve the reading resolution $R1$ can be calculated by the following formula.

$$\text{Line Cycle} = (1/R1) \times R2 \times \text{Encoder cycle}$$

Accordingly, as described in the image reading apparatus of the illustrative aspect of the invention, when the line start signal is transmitted to the reading unit, the line start signal can be appropriately input to the reading unit, corresponding to the velocity V of the transport target even when the encoder resolution $R2$ is not adjusted to a ratio of integers or a ratio of 1/integers of the reading resolution $R1$ by adjusting a gear ratio as described in the related art.

According to the illustrative aspect of the invention, it is possible to suppress deterioration in image quality caused by variation in velocity of the transport target, and it is possible to prevent the degree of freedom in design of the apparatus from decreasing as described in the related art since there is no hardware restriction. In other words, when the image reading apparatus is configured to transmit the line start signal to the reading unit, corresponding to the movement velocity of the transport target, it is possible to increase the degree of freedom in design, as compared with the related art.

BRIEF DESCRIPTION OF THE DRAWINGS

Illustrative aspects of the invention will be described in detail with reference to the following figures wherein:

FIG. 5 is a block diagram illustrating a configuration of a reading control unit 40;

FIG. 8 is a time chart illustrating an output aspect of a line start signal;

DETAILED DESCRIPTION OF EXEMPLARY EMBODIMENTS OF THE PRESENT INVENTION

Hereinafter, embodiments of the invention will be described with reference to the drawings.

(1) Overall Configuration of Image Reading Apparatus 1

Figure 1:
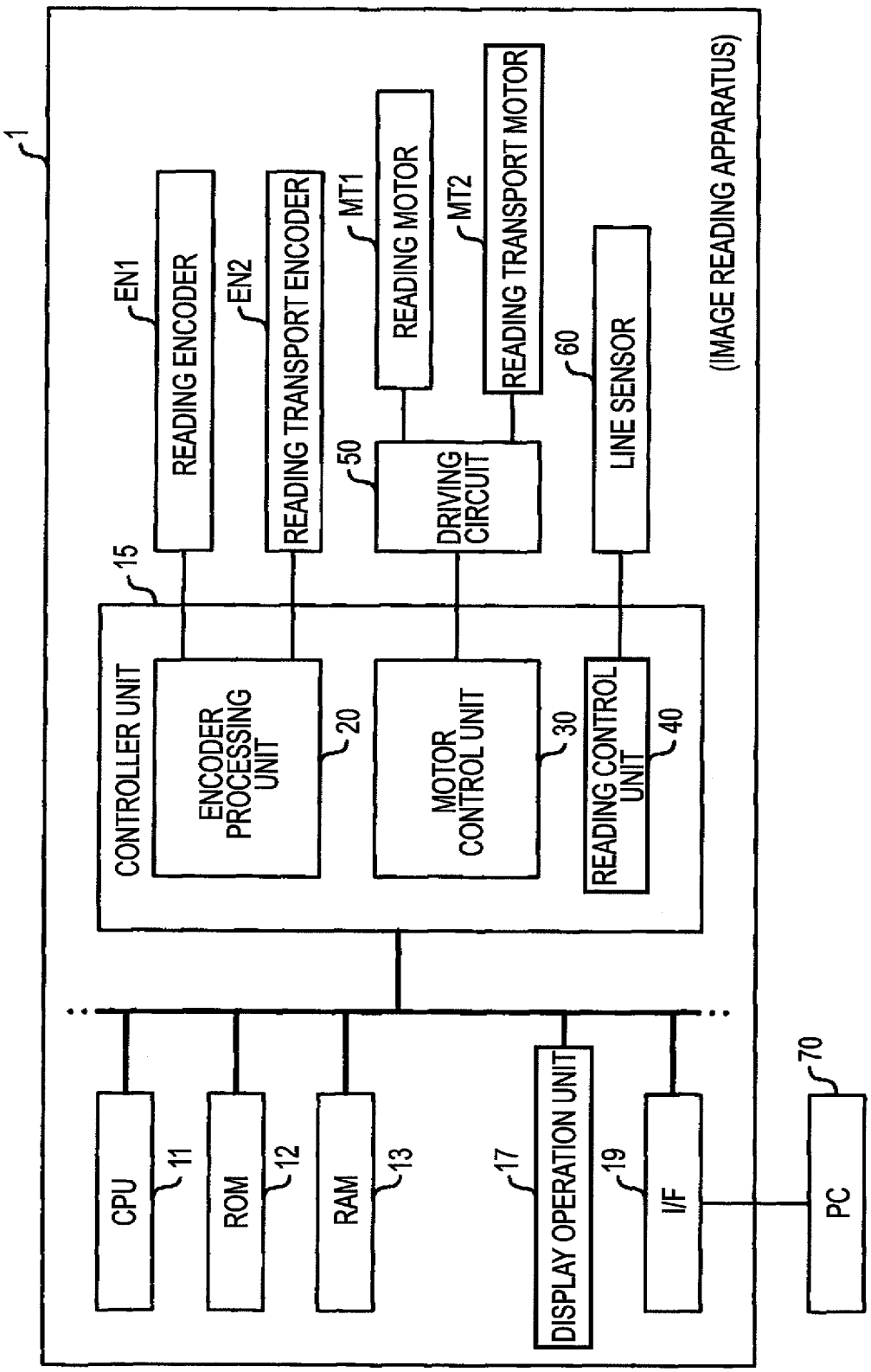
FIG. 1 is a block diagram illustrating an electrical configuration of an image reading apparatus 1.

FIG. 1 is a block diagram illustrating an electrical configuration of an image reading apparatus 1 according to an embodiment. The image reading apparatus 1 according to the embodiment includes a CPU 11 performing various operation processes, a ROM 12 storing various programs and data, and a RAM 13 used as a work area for the operations performed by the CPU 11, and the various programs are executed by CPU 11, thereby achieving an image reading function.

The image reading apparatus 1 includes a display operation unit 17 having various operation keys and a display for displaying information to function as a user interface, and an interface 19 connected to an external PC (personal computer) 70 to communicate with the external PC 70, and performs various processes according to user's instructions input through the display operation unit 17 or user's instructions input from the external PC 70 through the interface 19. The interface 19 may be a LAN interface, a USB interface, or the like.

The image reading apparatus 1 includes a controller unit 15 for realizing an image reading function. The controller unit 15 includes an encoder processing unit 20 processing signals transmitted from encoders EN1 and EN2, a motor control unit 30 controlling (PWM control) motors MT1 and MT2 on the basis of information obtained from the encoders EN1 and EN2, and a reading control unit 40 controlling a reading process of a line sensor 60 on the basis of the information obtained from the encoders EN1 and EN2.

The motors MT1 and MT2 are driven by a driving circuit 50. The motor MT1 transports a carriage 106 (see FIG. 2) on which the line sensor 60 is mounted in a sub-scanning direction, and the motor MT2 transports a document toward a reading position of the line sensor 60 in the sub-scanning direction through an ADF (Automatic Document Feeder) device 150. Hereinafter, the motor MT1 is particularly referred to as "reading motor", and the motor MT2 is particularly referred to as "reading transport motor".

The encoder EN1 specifies the position of the line sensor 60 on the transport path of the line sensor 60 in the sub-scanning direction. A rotary encoder and a linear encoder may be employed as the encoder EN1, but in the embodiment the rotary encoder is employed particularly. Specifically, the encoder EN1 is provided on a rotation shaft of the reading motor MT1. With such a configuration, in the embodiment, a pulse signal (A-phase signal, B-phase signal) is output from the encoder EN1 whenever the reading motor MT1 is rotated at a predetermined angle.

The encoder EN2 specifies the position of the document transported by the ADF device 150. In the embodiment, the encoder EN2 is provided on a rotation shaft of the reading transport motor MT2, and the encoder EN2 functions as a rotary encoder outputting a pulse signal (A-phase signal, B-phase signal) whenever the reading transport motor MT2 is rotated at a predetermined angle. Hereinafter, the encoder EN1 is particularly referred to as "reading encoder", and the encoder EN2 is particularly referred to as "reading transport encoder".

The line sensor 60 includes a linearly arranged light receiving element (photo diode) group 601 and a CCD analog shift register 603 (see FIG. 5) and is controlled by the reading control unit 40. Whenever the line start signal is input, signal charges accumulated in the light receiving elements are transmitted to the shift register 603. The light receiving elements are reset by the input operation, and the light receiving elements start the accumulation operation of new signal charges. With such a configuration, the line sensor 60 reads the document area placed at the position facing the line sensor 60 in a main scanning direction whenever the line start signal is input.

Information of the signal charges of the light receiving elements transmitted to the shift register 603 is output as pixel signals from an output terminal of the shift register 603, and is transmitted to the reading control unit 40. The pixel signals transmitted to the reading control unit 40 are converted into digital pixel data by the reading control unit 40. A pixel data group of one row of the light receiving elements is written as line image data representing a read image of one line in the RAM 13.

In the embodiment, the reading target document is read as described above, and the line image data of the number of predetermined lines is written in the RAM 13. The read image data representing the reading result of the document is generated by combination of the line image data.

The image reading apparatus 1 according to the embodiment is configured to read the document in any one of an ADF reading mode of performing the reading operation of each line by transporting the document in the sub-scanning direction using the ADF device 150, and an FB (flatbed) reading mode of performing the reading operation of each line by transporting the line sensor 60 in the sub-scanning direction and generating the read image data representing the reading result of the document with the document stopped.

That is, the line sensor 60 is fixed at a predetermined reading position at the time of reading the document based on the ADF reading mode, and reads the document passing through the reading position by the operation of the ADF device 150 (see FIG. 2) in each line. The line sensor 60, to which rotary power of the reading motor MT1 controlled by the motor control unit 30 is applied through the carriage 106, is moved in the sub-scanning direction along a platen 102A under the platen 102A on which the document is placed, at the time of reading the document based on the FB reading mode, and reads the document in each line according to the movement.

Figure 2:
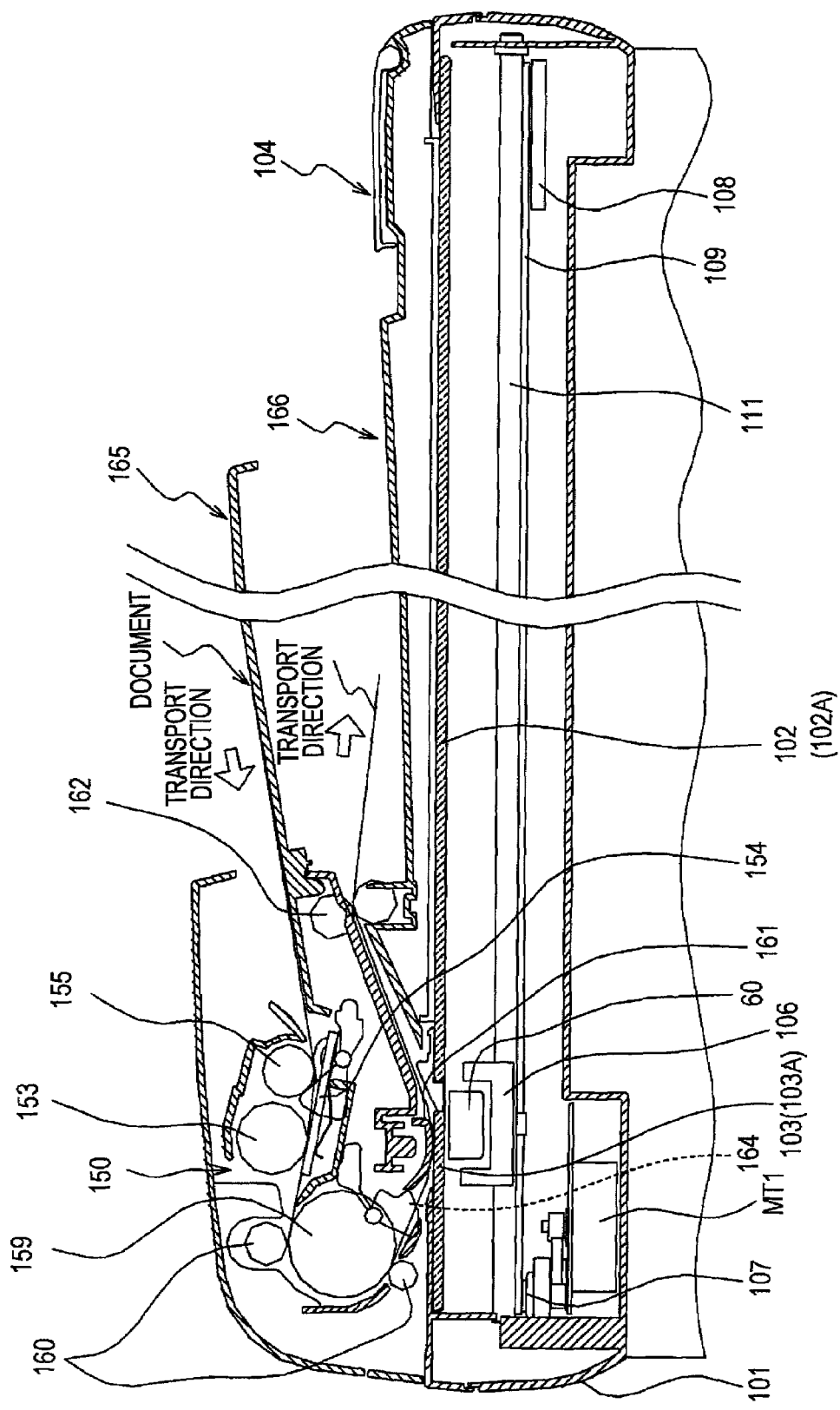
FIG. 2 is a cross-section view illustrating a mechanical configuration of the image reading apparatus 1.

Specifically, as shown in FIG. 2, a case of the image reading apparatus 1 includes an image reading window (hereinafter, referred to as FB reading window) 102 for the FB reading mode, and an image reading window (hereinafter, referred to as ADF reading window) 103 for the ADF reading mode. The reading windows 102 and 103 are closed by transparent platens 102A and 103A such as glass and acryl. FIG. 2 is a cross-sectional view illustrating a mechanical configuration of the image reading apparatus 1.

A document cover 104 covering the reading windows 102 and 103 is mounted on the upper side of an apparatus body 101 to be opened and closed. When the document is read by the FB reading window 102, a user opens the document cover 104 upward in a manual operation and places the reading target document on the FB reading window 102.

The line sensor 60 receiving light, which irradiates the document and is reflected from the document, and outputting pixel signals based on the amounted of received light is provided right under the reading windows 102 and 103 in the apparatus body 101, so as to be movable in a longitudinal direction (left and right direction in FIG. 2) of the apparatus body 101 that is the sub-scanning direction through the carriage 106. The direction in which the light receiving elements of the line sensor 60 are arranged is set to the main scanning direction perpendicular to the sub-scanning direction.

At the time of reading the document based on the ADF reading mode, the line sensor 60 is disposed to be stationary right under the ADF reading window 103. At the time of reading the document based on the FB reading mode, the line sensor 60 is moved at a regular velocity right under the FB reading window 102 by the control of the motor control unit 30.

The carriage 106 on which the line sensor 60 is mounted, is connected to a belt 109 suspended from a driving pulley 107 and a driven pulley 108. The belt 109 (strictly, driving pulley 107) is connected to the reading motor MT1 formed of a DC motor through a gear.

That is, at the time of reading the document based on the FB reading mode, the rotary power of the reading motor MT1 is applied to the line sensor 60 through the belt 109, and the line sensor 60 is moved straightly in the longitudinal direction of the apparatus body 101 (sub-scanning direction) while the line sensor 60 is guided by a guide shaft 111 provided parallel to the belt 109.

The image reading apparatus 1 is configured such that the line sensor 60 is moved by a predetermined distance when the reading motor MT1 is rotated at a predetermined angle. With such a configuration, in the embodiment, the encoder processing unit 20 detects the position or movement velocity of the line sensor 60 and detects the movement direction (forward/reverse direction) of the line sensor 60 on the basis of the A-phase signal and the B-phase signal transmitted from the reading encoder EN1. In the image reading apparatus 1, the motor control unit 30 controls the reading motor MT1 on the basis of the detection result, and moves the line sensor 60 at a regular velocity along the guide shaft 111.

The ADF device 150 transporting the reading target document to the ADF reading window 103 is provided at a part of the document cover 104 corresponding to the ADF reading window 103, separates documents accumulated and placed in a document tray 165, and transports the documents to the ADF reading window 103 that is the reading position, at the time of reading the document based on the ADF reading mode.

The ADF device 150 is a separation mechanism for separating the accumulated documents one by one, and includes a separation roller 153 coming into contact with the document placed on the top and applying a transport force to the document, a separation pad 154 disposed to face the separation roller 153, coming into contact with the document from the opposite side of the separation roller 153, and applying a predetermined transport resistance, and an absorption roller 155 absorbing the documents accumulated in the document tray 165 to send out the documents to the separation roller 153.

The ADF device 150 is a transport mechanism for transporting the document separated from the separation mechanism to the ADF reading window 103, and includes a feeding roller 159 turning the transport direction of the document separated and transported from the separation mechanism toward the ADF reading window 103 and applying a transport force, a pair of pinch rollers 160 and a document press 161 pressing the document to the feeding roller 159, a discharge roller 162, and a document sensor actuator 164.

The rollers constituting the ADF device 150 are rotated by the rotary power of the reading transport motor MT2, the force in the sub-scanning direction is applied to the document by the rotation, and the document is transported from the document tray 165 to a discharge tray 166. In the image reading apparatus 1, when the reading transport motor MT2 is rotated at a predetermined angle, the reading target document is moved by a predetermined distance in the sub-scanning direction.

The document press 161 presses the transported document to the ADF reading window 103. The line sensor 60 is disposed under the document press 161 and reads the document passing through this position at the time of reading the document based on the ADF reading mode at a constant velocity.

The document sensor actuator 164 is disposed on the upstream side of the document press 161, and detects whether or not the document passes through this position. In the embodiment, the encoder processing unit 20 detects the transport position of the document on the basis of ON/OFF signals output from the document sensor actuator 164 and pulse signals output from the reading transport encoder EN2 provided on the rotation shaft of the reading transport motor MT2 formed of a DC motor. The image reading apparatus 1 controls the transport of the document on the basis of the detection result, and transports the document to the reading position at a constant speed.

The document reading process corresponding to the FB reading mode is performed, in a state where no document is placed on the document tray 165, when a reading key (not shown) provided as one of the operation keys of the display operation unit 17 is pressed or a reading instruction is input through the interface 19. Accordingly, the image reading apparatus 1 reads the document placed on the FB reading window 102.

The document reading process corresponding to the ADF reading mode is performed, in a state where the documents are placed on the document tray 165, when the reading key is pressed or the reading instruction is input through the interface 19. The image reading apparatus 1 repeatedly performs the document reading process corresponding to the ADF reading mode until the documents placed on the document tray 165 are removed, and the documents placed on the document tray 165 are sequentially read.

(2) Configuration of Encoder Processing Unit 20 and Motor Control Unit 30

(2-1) Configuration of Encoder Processing Unit 20

Figure 3:
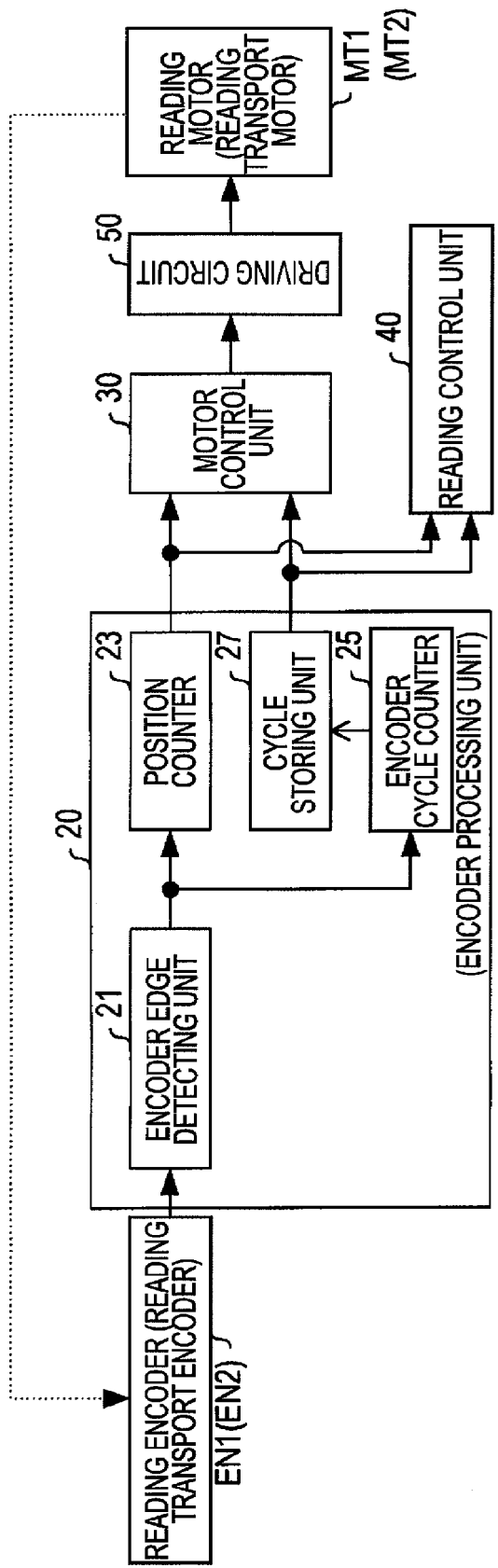
FIG. 3 is a block diagram illustrating a peripheral configuration of an encoder processing unit 20.

A configuration of the encoder processing unit 20 and the motor control unit 30 will be described. FIG. 3 is a block diagram illustrating the configuration in the vicinity of the encoder processing unit 20 and the motor control unit 30.

The encoder processing unit 20 includes a group of an encoder edge detecting unit 21, a position counter 23, an encoder cycle counter 25, and a cycle storing unit 27, for each of the encoders EN1 and EN2. The groups detect the rotation amount and the rotation rate of the corresponding motors MT1 and MT2, and indirectly detect the position and the velocity of a transport target (line sensor 60 or document).

Specifically, the encoder edge detecting unit 21 detects a rising edge of A-phase signals transmitted from the corresponding encoders EN1 and EN2, and outputs an edge detection signal for each detection of the edge. The edge detection signal is transmitted to the position counter 23 and the encoder cycle counter 25 of the corresponding group. For example, the edge detection signal output from the encoder edge detecting unit 21 for the reading encoder EN1 to which the output signal of the reading encoder EN1 is input, is transmitted to the position counter 23 and the encoder cycle counter 25 for the reading encoder EN1.

The encoder edge detecting unit 21 detects the movement direction (forward direction/reverse direction) of a transport target on the basis of difference in phase of the A-phase signal and B-phase signal transmitted from the corresponding encoder EN1 and EN2, and transmits the detection result and the edge detection signal to the position counter 23 of the corresponding group.

Figure 4A:
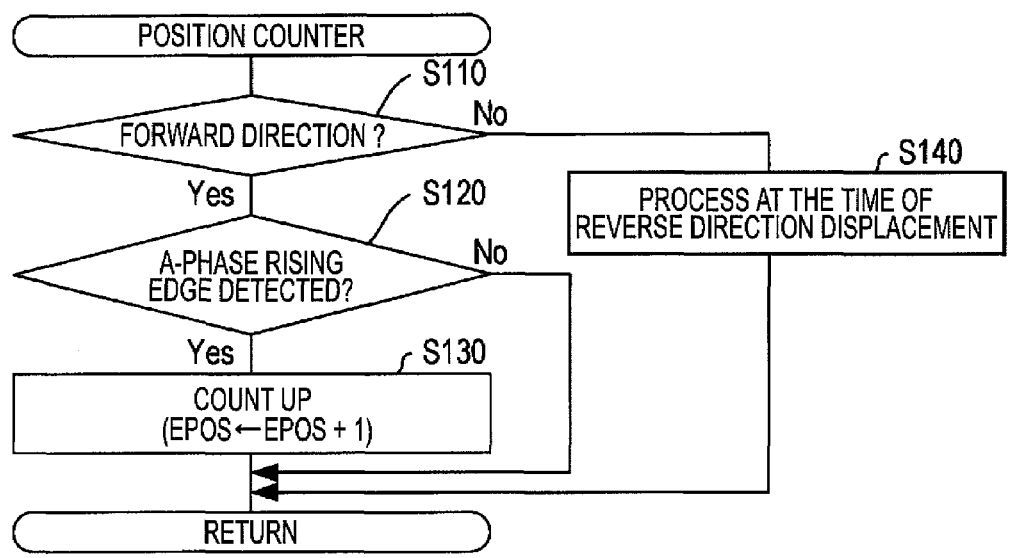
FIGS. 4A and 4B are flowcharts illustrating processes performed by a position counter 23 and an encoder cycle counter 25.

The position counter 23 updates a count value EPOS whenever the edge detection signal is transmitted from the encoder edge detecting unit 21 in the operation of the image reading apparatus 1. Specifically, the position counter 23 repeatedly performs the process shown in FIG. 4A. FIG. 4A is a flowchart illustrating the process performed by the position counter 23.

That is, the position counter 23 determines whether or not the movement direction is the forward direction from the reading start position to the end position of the document on the basis of the information of the movement direction of the transport target transmitted from the encoder edge detecting unit 21 (S110).

When the movement direction is the forward direction (S110: Yes) and the edge detection signal is transmitted from the encoder edge detecting unit 21 (S120: Yes), a process of adding 1 to the count value EPOS is performed (S130). Meanwhile, when the movement direction is the reverse direction (S110: No), a process of subtracting 1 from the count value EPOS is performed according to the movement of the transport target (S140) in the same manner as the related art.

As described above, the position counter 23 performs the process of updating the counter value EPOS according to the movement of the transport target on the basis of the edge detection signal.

The position counter 23 for the reading encoder EN1 initializes the value EPOS when the line sensor 60 is disposed at a standard position. The position counter 23 for the reading transport encoder EN2 initializes the value EPOS when the document sensor actuator 164 detects the leading end of the document. Accordingly, in the position counter 23 for the reading encoder EN1, the position of the line sensor 60 is detected. In the position counter 23 for the reading transport encoder EN2, the transport position of the document is detected.

The encoder cycle counter 25 measures the time interval between the rising edges of the A-phase signals output from the corresponding encoders EN1 and EN2 on the basis of the edge detection signal transmitted from the encoder edge detecting unit 21. Accordingly, the encoder cycle counter 25 detects a velocity of the transport target. The velocity of the transport target can be obtained from the reciprocal of the time interval between the rising edges.

Figure 4B:
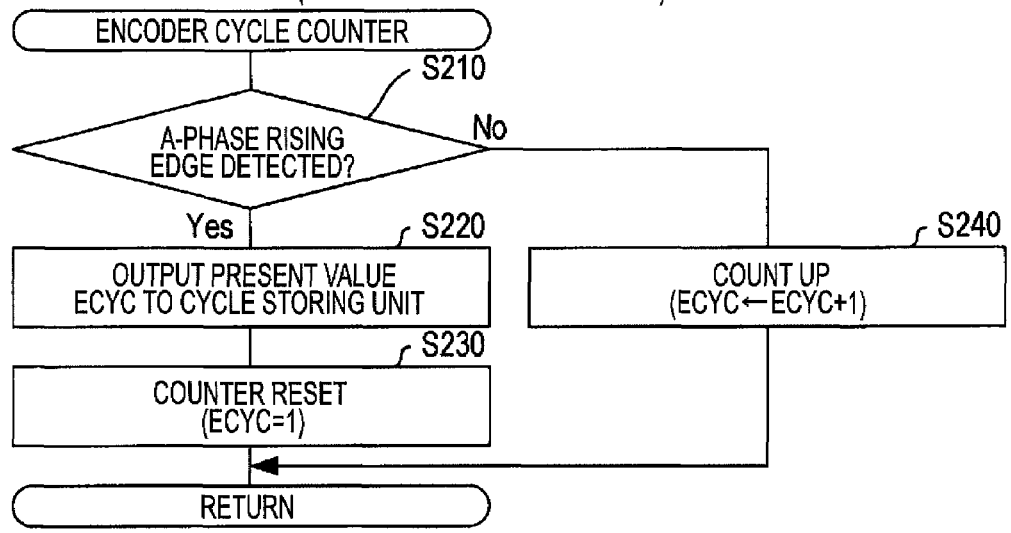

Specifically, the encoder cycle counter 25 repeatedly performs the process shown in FIG. 4B at each unit time on the basis of a clock signal output from a clock signal generator (not shown) built in the controller unit 15. FIG. 4B is a flowchart illustrating the process performed by the encoder cycle counter 25.

That is, when the edge detection signal is transmitted from the encoder edge detecting unit 21 (S210: Yes), the encoder cycle counter 25 outputs the current count value ECYC to the cycle storing unit 27 (S220) and resets the count value ECYC to "1" (S230). When the edge detection signal is not transmitted (S210: No), the encoder cycle counter 25 performs a count-up process of adding 1 to the current count value ECYC (S240).

As described above, the encoder cycle counter 25 measures the time interval between the rising edges of the A-phase signals output from the corresponding encoder EN1 and EN2.

The cycle storing unit 27 stores the count value ECYC output from the encoder cycle counter 25 as the encoder cycle. The cycle storing unit 27 updates the encoder cycle stored at the time point whenever the count value ECYC is transmitted from the encoder cycle counter 25, to the newly input count value ECYC.

(2-2) Configuration of Motor Control Unit 30

Subsequently, a configuration of the motor control unit 30 will be described. The motor control unit 30 controls the motors MT1 and MT2 of the control targets through the driving circuit 50 on the basis of the count value EPOS of the position counter 23 corresponding to the motor of the control target and the encoder cycle stored in the cycle storing unit 27.

Specifically, at the time of reading the document based on the FB reading mode, the motor control unit 30 controls the reading motor MT1 to move the line sensor 60 at a uniform velocity on the movement path of the line sensor 60 from the reading start position of the document leading line to the reading end position of the document final line, on the basis of the count value EPOS obtained from the position counter 23 for the reading encoder EN1 of the encoder processing unit 20 and the encoder cycle obtained from the cycle storing unit 27 for the reading encoder EN1.

At the time of reading the document based on the ADF reading mode, the motor control unit 30 controls the reading transport motor MT2 to move the document of the reading target at a uniform velocity from the reading start time point of the document leading line to the reading end time point of the document final line, on the basis of the count value EPOS obtained from the position counter 23 for the reading transport encoder EN2 of the encoder processing unit 20 and the encoder cycle obtained from the cycle storing unit 27 for the reading transport encoder EN2. As described above, in the image reading apparatus 1, the document of the reading target is transported at the uniform velocity to the reading position at the time of reading the document based on the ADF reading mode.

(3) Configuration of Reading Control Unit 40

(3-1) Overall Configuration

Subsequently, a configuration of the reading control unit 40 will be described. FIG. 5 is a block diagram illustrating the configuration of the reading control unit 40. As shown in FIG. 5, the reading control unit 40 includes a reading front end 41, an image data processing unit 43, a local RAM 45, and a memory controller 47.

Specifically, the reading front end 41 is connected to the line sensor 60, transmits a control signal to the line sensor 60, and receives and processes pixel signals input from the line sensor 60.

The reading front end 41 includes a line start signal generating unit 411, a transmission clock signal generating unit 417, and an output control unit 419, and transmits a line start signal designating the reading start time of a line image to the line sensor 60 by the line start signal generating unit 411.

Specifically, at the time of reading the document based on the FB reading mode, the line start signal generating unit 411 determines whether or not the line sensor 60 that is the transport target reaches the reading start position of the document leading line on the basis of the count value EPOS obtained from the position counter 23 for the reading encoder EN1, and starts outputting the line start signal at the time point of reaching. Then, the line start signal generating unit 411 transmits the line start signal to the line sensor 60 whenever a predetermined condition is satisfied, on the basis of the encoder cycle stored in the cycle storing unit 27 for the reading encoder EN1 (to be described in detail later).

Similarly, at the time of reading the document based on the ADF reading mode, the line start signal generating unit 411 determines whether or not the reading start position of the document leading line reaches the reading position of the line sensor 60 on the basis of the count value EPOS obtained from the position counter 23 for the reading transport encoder EN2, and starts outputting the line start signal at the time point of reaching. Then, the line start signal generating unit 411 transmits the line start signal to the line sensor 60 whenever a predetermined condition is satisfied on the basis of the encoder cycle stored in the cycle storing unit 27 for the reading transport encoder EN2.

As described above, when the line start signal is transmitted, in the line sensor 60, the signal charges accumulated in the light receiving element are transmitted to the shift register 603 and the information of the signal charges previously accumulated in the light receiving element before the input of the line start signal is stored in the shift register 603 as pixel information of the previous line. At this time, in the light receiving element, the signal charges are reset, and a new reading operation using the photoelectric effect is performed.

The transmission clock signal generating unit 417 transmits a transmission clock signal to the line sensor 60 by synchronizing with the input of the line start signal to the line sensor 60 performed by the line start signal generating unit 411. The transmission clock signal functions as a control signal for sequentially outputting the pixel signals to the shift register 603.

By the input of the transmission clock signal, the pixel signals stored as the information of the signal charges in the shift register 603 are output from the shift register 603 to the reading front end 41 once, until the next line start signal is transmitted. In the image reading apparatus 1 according to the embodiment, the input cycle of the line start signal is varied according to the velocity of the transport target. Accordingly, even when variation in velocity of the transport target occurs due to a control error, the transmission clock signal generating unit 417 transmits the transmission clock signal to the line sensor 60 so that pixel signals are output from the shift register 603 once until the next line start signal is transmitted.

The output control unit 419 converts the pixel signals transmitted from the shift register 603 to the reading front end 41 into digital data, and transmits a digital data group corresponding to the pixel signals of one line to the image data processing unit 43, as line image data representing a read image of one line. Unnecessary data occurring in the course of the reading operation is appropriately destroyed, and only necessary data is transmitted from the output control unit 419 to the image data processing unit 43.

The image data processing unit 43 sequentially writes the line image data transmitted from the reading front end 41, into the local RAM 45, performs an image process such as shading correction and gamma correction on the line image data accumulated in the local RAM 45, and writes the image-processed line image data into the RAM 13 through the memory controller 47.

In the embodiment, the image of the entire document is represented by the combination of the line image data written into the RAM 13 as described above, and the read image data representing the reading result of the document is generated. The image reading apparatus 1 sequentially outputs the line image data written into, for example, the RAM 13, to the external PC 70 through the interface 19, thereby providing the reading result to the external PC 70.

(3-2) Detailed Configuration of Line Start Signal Generating Unit 411

Subsequently, a detailed configuration of the line start signal generating unit 411 will be described.

The line start signal generating unit 411 according to the embodiment transmits the line start signal to the line sensor 60 at a time interval corresponding to the velocity of the transport target on the basis of the encoder cycle obtained from the cycle storing unit 27, thereby suppressing deterioration in quality of the read image data caused by the variation in velocity of the transport target due to the control error.

Specifically, the line start signal generating unit 411 transmits the line start signal to the line sensor 60 on the basis of a reading resolution R1 set in a register RG1 of the controller unit 15 and an encoder resolution R2 set in a register RG2 of the controller unit 15 in the same manner by the operation of the CPU 11, using a correction coefficient $\alpha=R2/R1$ determined by a ratio $R2/R1$ of them, whenever the time elapsed from the input time point of the previous line start signal is equal to or greater than a time obtained by multiplying the encoder cycle stored in the cycle storing unit 27 by the correction coefficient $\alpha$.

The reading resolution R1 is the number of reading lines per unit length in the sub-scanning direction to be achieved. The encoder resolution R2 is the number of outputs of the A-phase signal rising edges output while the transport target is moved by a unit length.

The reading resolution R1 is set by the CPU 11 according to an instruction input from the user through the display operation unit 17 or an instruction input through the interface 19 from the user. For example, the CPU 11 displays a selectable screen of reading resolutions of a predetermined standard such as 300 dpi, 600 dpi, 1200 dpi, and 2400 dpi on the display of the display operation unit 17, and performs a process of setting the reading resolution selected through the operation key in the register RG1.

The encoder resolution is determined by performance of the encoder installed in the image reading apparatus 1. In the embodiment, the encoder resolution of the reading encoder EN1 and the encoder resolution of the reading transport encoder EN2 are recorded in advance in the ROM 12, and the CPU 11 sets the encoder resolution of the reading encoder EN1 stored in the ROM 12 in the register RG2 at the time of reading the document based on the FB reading mode and sets the encoder resolution of the reading transport encoder EN2 stored in the ROM 12 in the register RG2 at the time of reading the document based on the ADF reading mode.

The principle of determining the output time of the line start signal in the embodiment will be described. When the velocity of the transport target is V, the encoder cycle can be calculated by the following formula.

$$\text{Encoder Cycle} = (1/R2) \times (1/V)$$

When the velocity of the transport target is V, a line cycle (output time interval of line start signal) for achieving the reading resolution R1 can be calculated by the following formula.

$$\text{Line Cycle} = (1/R1) \times (1/V)$$

Accordingly, the line cycle for achieving the reading resolution R1 can be calculated as follows using the encoder cycle.

$$\text{Line Cycle} = (1/R1) \times R2 \times \text{Encoder cycle}$$

Accordingly, in the circumstance where the velocity V of the transport target is not regular, the line start signal is output whenever it is equal to or greater than the time obtained by multiplying the encoder cycle stored in the cycle storing unit 27 by the correction coefficient α, thereby suppressing deterioration in image quality of the read image data caused by the variation in velocity of the transport target.

Figure 6:
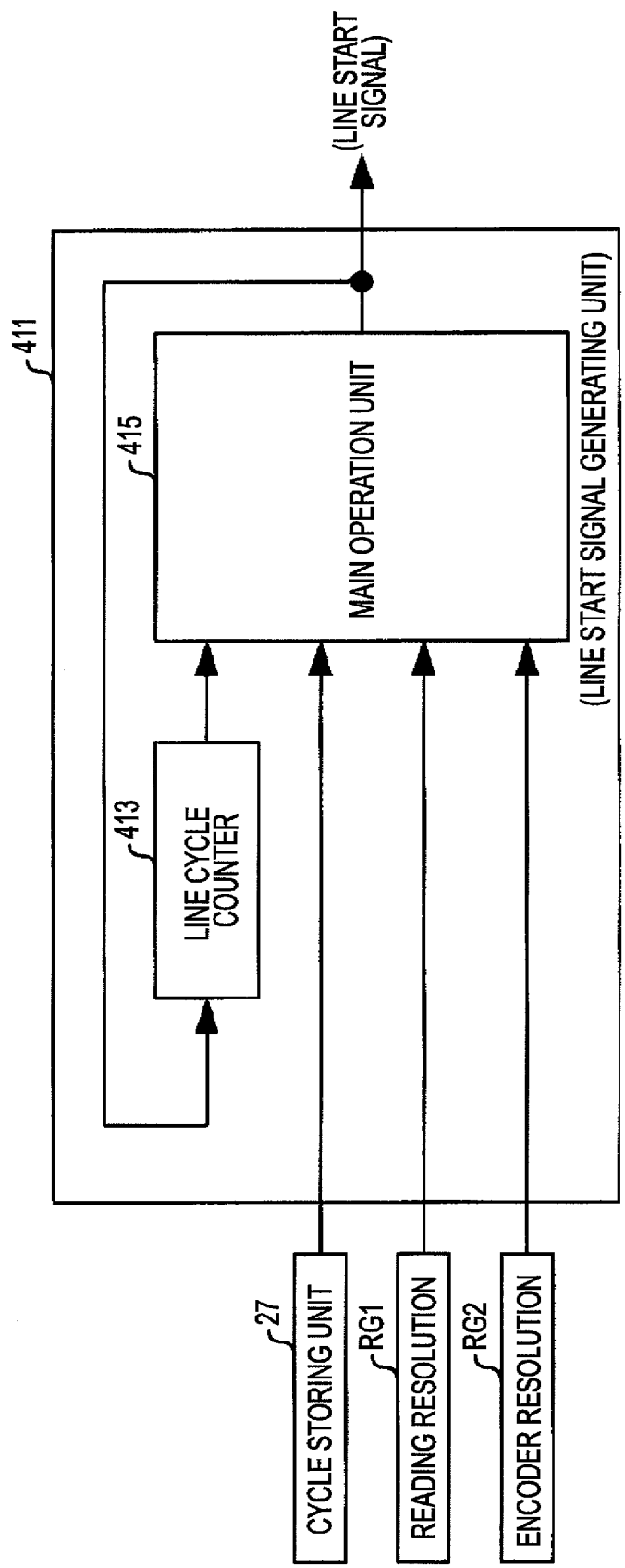
FIG. 6 is a block diagram illustrating a configuration of a line start signal generating unit 411.

As a configuration for achieving the above-described operation, the line start signal generating unit 411 according to the embodiment includes a line cycle counter 413 and a main operation unit 415. FIG. 6 is a block diagram illustrating a detailed configuration of the line start signal generating unit 411.

Figure 7A:
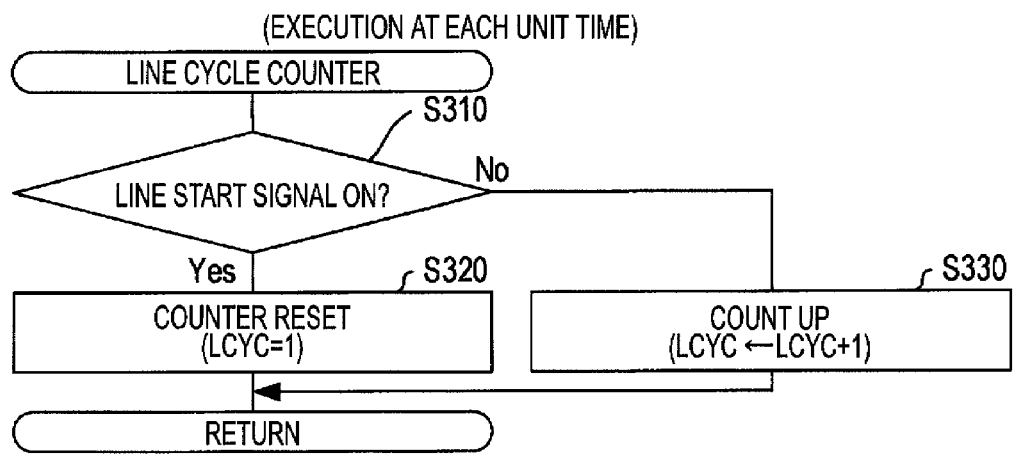
FIG. 7A and FIG. 7B are flowcharts illustrating processes performed by a line cycle counter 413 and a main operation unit 415.

The line cycle counter 413 constituting the line start signal generating unit 411 repeatedly performs the process shown in FIG. 7A on the basis of the clock signal output from the clock signal generator (not shown) at each unit time, and measures the elapsed time after the line start signal is transmitted to the line sensor 60 at the last. FIG. 7A is a flowchart illustrating the process performed by the line cycle counter 413.

That is, when the line start signal is transmitted from the main operation unit 415 to the line sensor 60 (S310: Yes), the line cycle counter 413 resets the count value LCYC to "1" (S320). When the line start signal is not transmitted, the line cycle counter 413 performs a count-up process by adding 1 to the current count value LCYC (S330).

As described above, the line cycle counter 413 measures the elapsed time after the line start signal is output from the main operation unit 415 at the last.

Figure 7B:
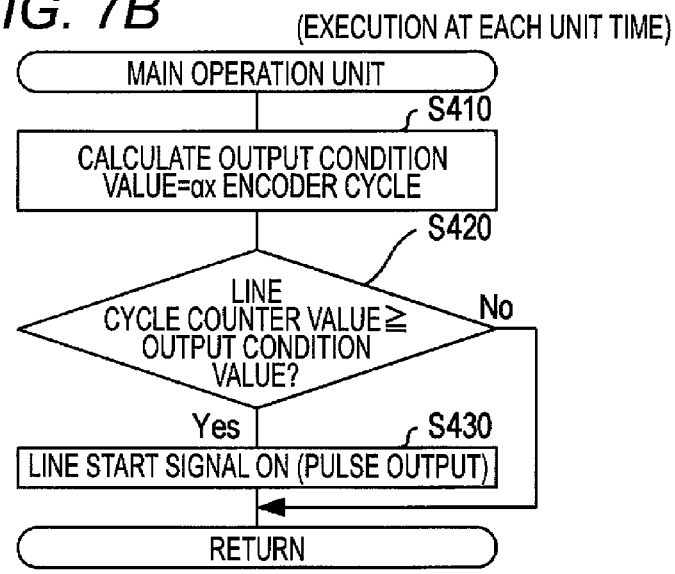

The main operation unit 415 sets the cycle storing unit 27 for the reading encoder EN1 as a referential spot at the time of reading the document based on the FB reading mode, and sets the cycle storing unit 27 for the reading transport encoder EN2 as a referential spot at the time of reading the document based on the ADF reading mode. The main operation unit 415 repeatedly performs the process shown in FIG. 7B on the basis of the clock signal at each unit time. FIG. 7B is a flowchart illustrating the process performed by the main operation unit 415.

That is, the main operation unit 415 refers to the cycle storing unit 27 as the referential spot at each unit time, and sets the value obtained by multiplying the encoder cycle stored at this time point in the cycle storing unit 27 by the correction coefficient α, as an output condition value (S410).

$$\text{Output Condition Value} = \alpha \times \text{Encoder cycle}$$

For example, when the reading resolution R1 is 600 dpi and the encoder resolution R2 is 720 dpi, the output condition value is set as follows.

$$\text{Output Condition Value} = (720/600) \times \text{Encoder cycle}$$

Then, the count value LCYC represented by the line cycle counter 413 is compared with the output condition value (S420). When the count value LCYC is less than the output condition value (S420: No), the line start signal is not output. When the count value LCYC is equal to or greater than the output condition value (S420: Yes), the line start signal is output and transmitted to the line sensor 60 (S430).

FIG. 8 is a time chart illustrating a correspondence relationship of the line start signal output by the main operation unit 415 operated as described above, the output signals of the encoders EN1 and EN2, the count value ECYC of the encoder cycle counter 25, the encoder cycle stored in the cycle storing unit 27, and the count value LCYC of the line cycle counter 413.

As shown in FIG. 8, the main operation unit 415 outputs the line start signal on the basis of the latest encoder cycle, and transmits the line start signal to the line sensor 60 at a time interval corresponding to the reading resolution R1 considering variation in velocity of the transport target, thereby performing the reading operation.

In this case, the line start signal is not output when the count value LCYC is the output condition value, but the line start signal is output when the count value LCYC is equal to or greater than the output condition value. The reason is because the output condition value (α×Encoder cycle) is discontinuous before and after the encoder cycle stored in the cycle storing unit 27 is updated, since the cycle storing unit 27 determines the output condition value with reference to the encoder cycle stored in the cycle storing unit 27 at each unit time. In other words, even when the previous cycle is in the relation of count value LCYC<output condition value, it may becomes the relation of count value LCYC>output condition value at the next cycle.

(4) Advantages

The image reading apparatus 1 according to the embodiment has been described. According to the image reading apparatus 1, the line start signal is transmitted on the basis of the actually measured value of the encoder cycle, and thus it is possible to generate the read image data with satisfactory image quality, without depending on variation in velocity of the transport target.

According to the embodiment, it is possible to transmits the line start signal corresponding to the variation in velocity of the transport target even when the encoder resolution R2 is not adjusted to a ratio of integers or a ratio of 1/integers of the reading resolution R1 as described in the related art, and thus the degree of freedom in design of hardware is improved.

For example, in the case of using the general-purpose rotary encoder, there is a limit of resolution capability (the number of pulses per rotation). Accordingly, it is not possible to adjust the encoder resolution R2 to the ratio of integers or the ratio of 1/integers of the reading resolution R1 by only selecting the rotary encoder to be used.

That is, to adjust the encoder resolution R2 to the ratio of integers or the ratio of 1/integers of the reading resolution R1, an operation of adjusting a gear ratio in a power transfer system from the motors MT1 and MT2 to the transport target is necessary. However, the adjustment of the gear ratio is a very troublesome work. The market requires products to be small, but it is difficult to adjust the encoder resolution R2 to the ratio of integers or the ratio of 1/integers of the reading resolution R1 while satisfying such a condition of the small size.

According to the technique of the embodiment, such an adjustment in hardware is not necessary, and thus there are advantages that it is possible to promptly perform product development and it is possible to easily make the products small at a low cost.

The correspondence relationship between the components described in "Claims" and the embodiment is as follows. That is, the reading unit corresponds to the line sensor 60, the transport unit corresponds to the motors MT1 and MT2 and the power transfer mechanism from the motors MT1 and MT2 to the line sensor 60 or the document, and the control unit corresponds to the main operation unit 415 of the line start signal generating unit 411.

The time measuring unit corresponds to the line cycle counter 413, the cycle measuring unit corresponds to the encoder cycle counter 25, and the storing unit corresponds to the cycle storing unit 27.

However, in the image reading apparatus 1, there is a time lag until the line start signal is output using the actually measured encoder cycle after the encoder cycle is actually measured.

Therefore, when a large variation in the velocity of the transport target momentarily occurs, it is difficult to sufficiently cope with the variation in the velocity. Accordingly, an improper difference may occur between the actual movement amount of the transport target and the input time of the line start signal. Thus, it is preferable to modify the above-described image reading apparatus 1 as follows (first modified embodiment).

(5) First Modified Embodiment

Subsequently, a first modified embodiment of the image reading apparatus 1 will be described. The image reading apparatus of the first modified embodiment is different in the configuration of the line start signal generating unit 411 from the image reading apparatus 1 of the embodiment. Accordingly, hereinafter, the configuration of the image reading apparatus of the first modified embodiment different from the image reading apparatus 1 of the embodiment will be selectively described, and the description of the same configurations as those of the image reading apparatus 1 of the embodiment is appropriately omitted.

Figure 9:
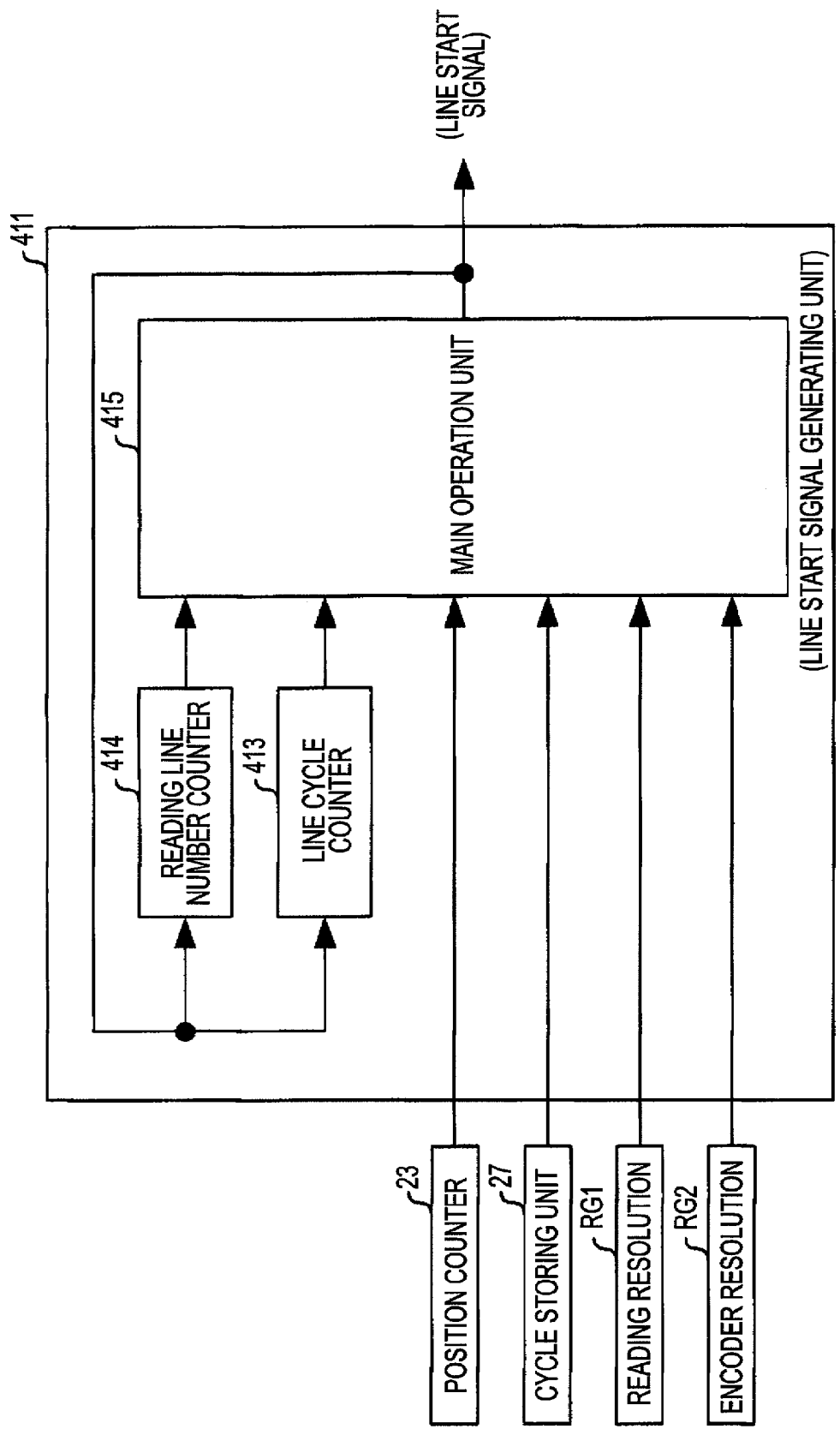
FIG. 9 is a block diagram illustrating a configuration of a line start signal generating unit 411 according to a first modified embodiment.

FIG. 9 is a block diagram illustrating a line start signal generating unit 411 of the first modified embodiment. As shown in FIG. 9, the line start signal generating unit 411 of the first modified embodiment includes a line cycle counter 413, a reading line number counter 414, and a main operation unit 415. The line cycle counter 413 performs the process shown in FIG. 7A as described above, and measures the elapsed time after the line start signal is transmitted to the line sensor 60.

Figure 10A:
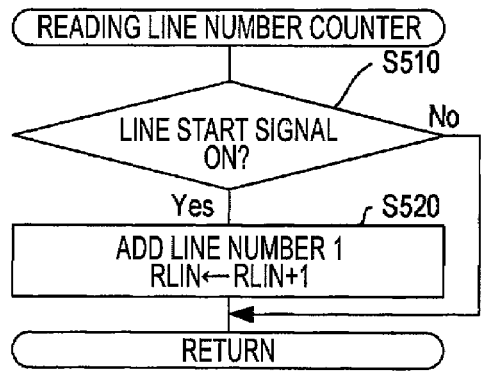
FIG. 10A and FIG. 10B are flowcharts illustrating processes performed by a reading line number counter 414 and a main operation unit 415 according to the first modified embodiment.

The reading line number counter 414 is controlled by the CPU 11, resets a count value RLIN to "0" at the time of starting the document reading, and repeatedly performs the process shown in FIG. 10A, thereby detecting the number of lines on which the reading operation is performed by the line sensor 60.

FIG. 10A is a flowchart illustrating the process performed by the reading line number counter 414. That is, whenever the line start signal is transmitted from the main operation unit 415 to the line sensor 60 (S510: Yes), the reading line number counter 414 performs a process of updating the count value RLIN by adding 1 thereto (S520), thereby detecting the number of lines on which the reading operation is performed by the line sensor 60.

Figure 10B:
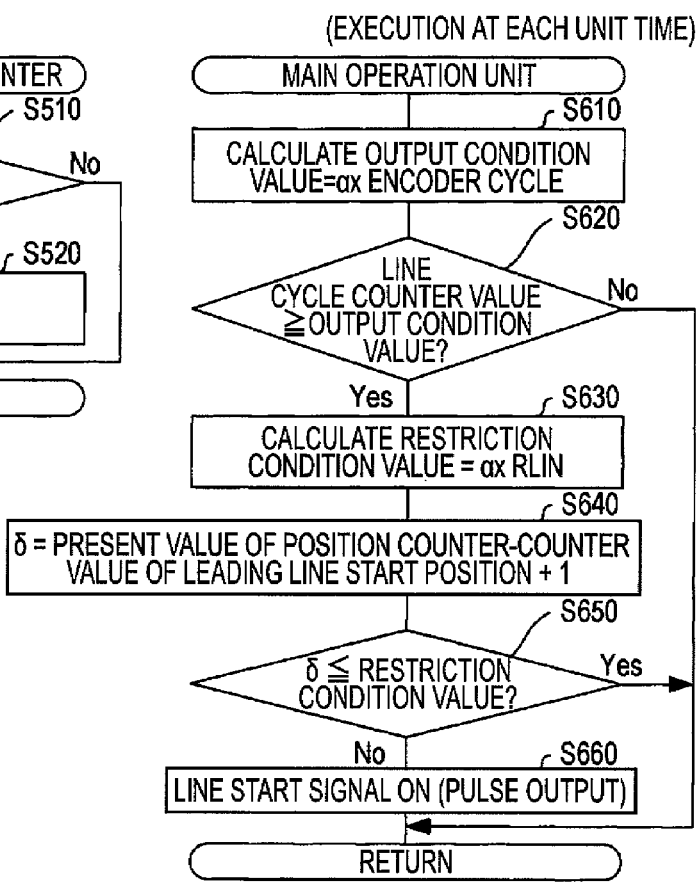

The main operation unit 415 sets the referential spot as described in the embodiment, and repeatedly performs the process shown in FIG. 10B at each unit time on the basis of the clock signal. FIG. 10B is a flowchart illustrating the process performed by the main operation unit 415 of the first modified embodiment.

That is, the main operation unit 415 refers to the cycle storing unit 27 as the referential spot at each unit time, and sets the value obtained by multiplying the encoder cycle stored at this time point in the cycle storing unit 27 by the correction coefficient α, as the output condition value (S610) in the same manner as S410.

The count value LCYC represented by the line cycle counter 413 is compared with the output condition value (S620). When the count value LCYC is less than the output condition value (S620: No), the line start signal is not output. Even when the count value LCYC is equal to or greater than the output condition value but when a predetermined restriction condition is satisfied (S650: Yes), the line start signal is not output.

That is, when the count value LCYC is equal to or greater than the output condition value (S620: Yes), the value obtained by multiplying the count value RLIN represented by the reading line number counter 414 by the correction efficient cc is set as the restriction condition value (S630).

$$\text{Restriction Condition Value} = \alpha \times \text{RLIN}$$

The transport amount of the transport target from the reading start position of the document leading line is calculated as a count value δ on the basis of the count value EPOS represented by the position counter 23 corresponding to the reading mode (S640).

Specifically, the count value δ is calculated so that the count value δ at the reading start position of the document leading line is "1" on the basis of a value E0 of the position counter 23 at the time point of transmitting the line start signal to the line sensor 60 for the first time to perform the reading operation of the document leading line (S640).

$$\delta = \text{Current Value EPOS of Position Counter 23} - E0 + 1$$

When a coordinate system of the position counter 23 is set from the first time as described above, that is, in the case of E0=1, it is obvious that it is not necessary to perform the process of S640.

When the counter value δ is equal to or less than the restriction condition value (S650: Yes), it is determined that the restriction condition is satisfied and the line start signal is not output.

In other words, when the count value LCYC represented by the line cycle counter 413 is equal to or greater than the output condition value and the count value δ is over the restriction condition (S650: No), the main operation unit 415 outputs the line start signal (S660).

Figure 11:
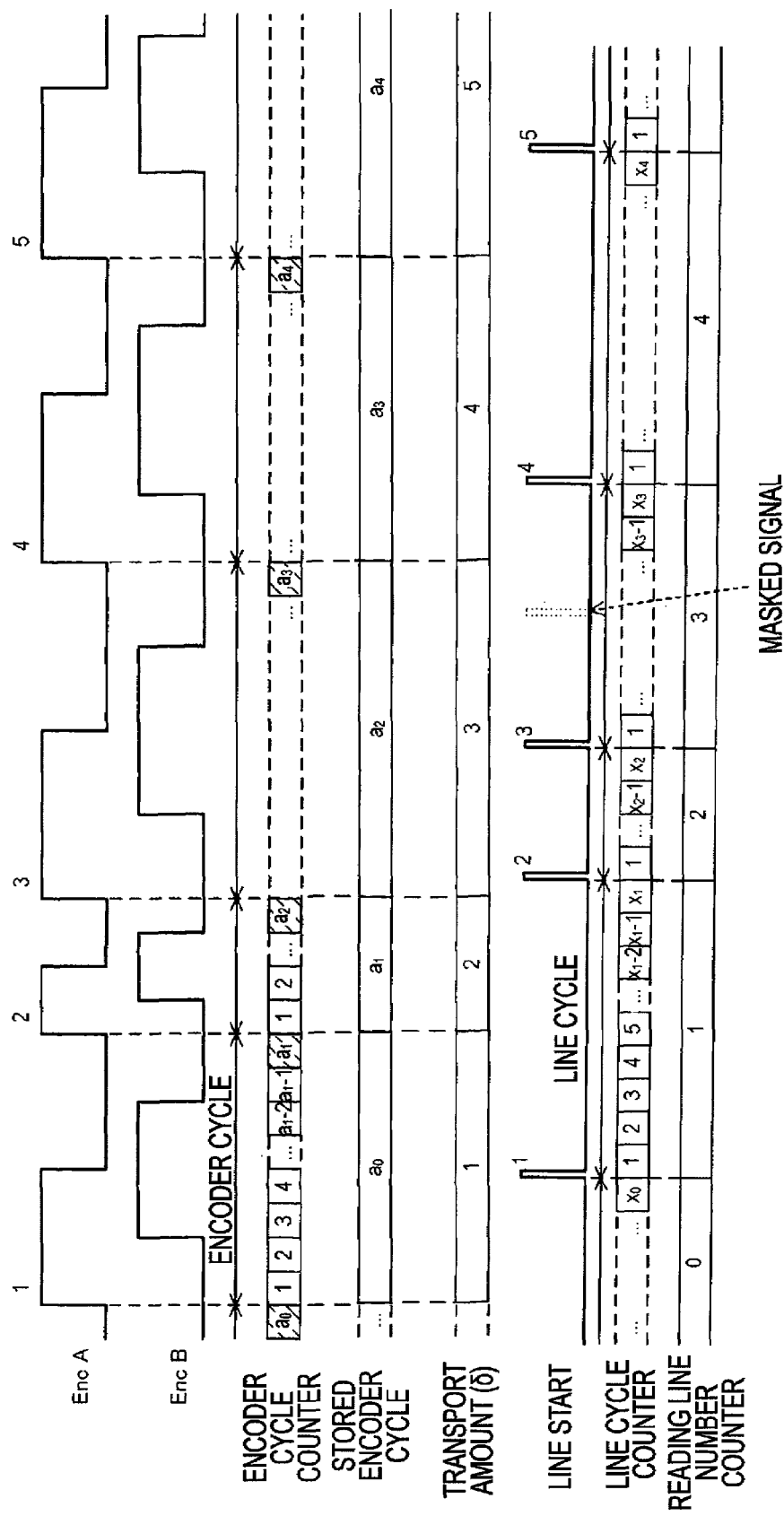
FIG. 11 is a time chart illustrating an output aspect of a line start signal according to the first modified embodiment.

FIG. 11 is a time chart illustrating a correspondence relationship of the line start signal output by the main operation unit 415 operating as described above, the output signals of the encoders EN1 and EN2, the count value ECYC of the encoder cycle counter 25, the encoder cycle stored in the cycle storing unit 27, the transport amount (count value δ) of the transport target, the count value LCYC of the line cycle counter 413, and the count value RLIN of the reading line number counter 414.

As described in the embodiment, when the line start signal is transmitted to the line sensor 60 by the algorithm shown in FIG. 7B, sudden variation in velocity occurs in the transport target and the encoder cycle stored in the cycle storing unit 27 is temporarily shortened as shown in FIG. 11 ($a_2$ shown in FIG. 11). Then, even when the transport velocity is decreased, the line start signal is input to the line sensor 60 on the basis of the short encoder cycle $a_2$ until the encoder cycle stored in the cycle storing unit 27 is updated. As a result, the excessive line start signal shown by the dotted line in FIG. 11 is transmitted.

Therefore, in the embodiment, the transmitting of the line start signal to the line sensor 60 is temporarily stopped so that the excessive line start signal is not transmitted to the line sensor 60 during a period of satisfying the conditional expression $\delta \leq \alpha \times RLIN$.

According to the embodiment, even when the velocity of the transport target is suddenly varied, the line start signal can be appropriately transmitted to the line sensor 60 at the time corresponding to the velocity of the transport target. As a result, it is possible to generate the read image data with satisfactory image quality without extra reading.

The output count unit described in "Claims" corresponds to the position counter 23, the line number count unit corresponds to the reading counter 414, and the excessive input determining unit corresponds to the processes of S630 to S650 performed by the main operation unit 415.

(6) Second Modified Embodiment

Figure 12:
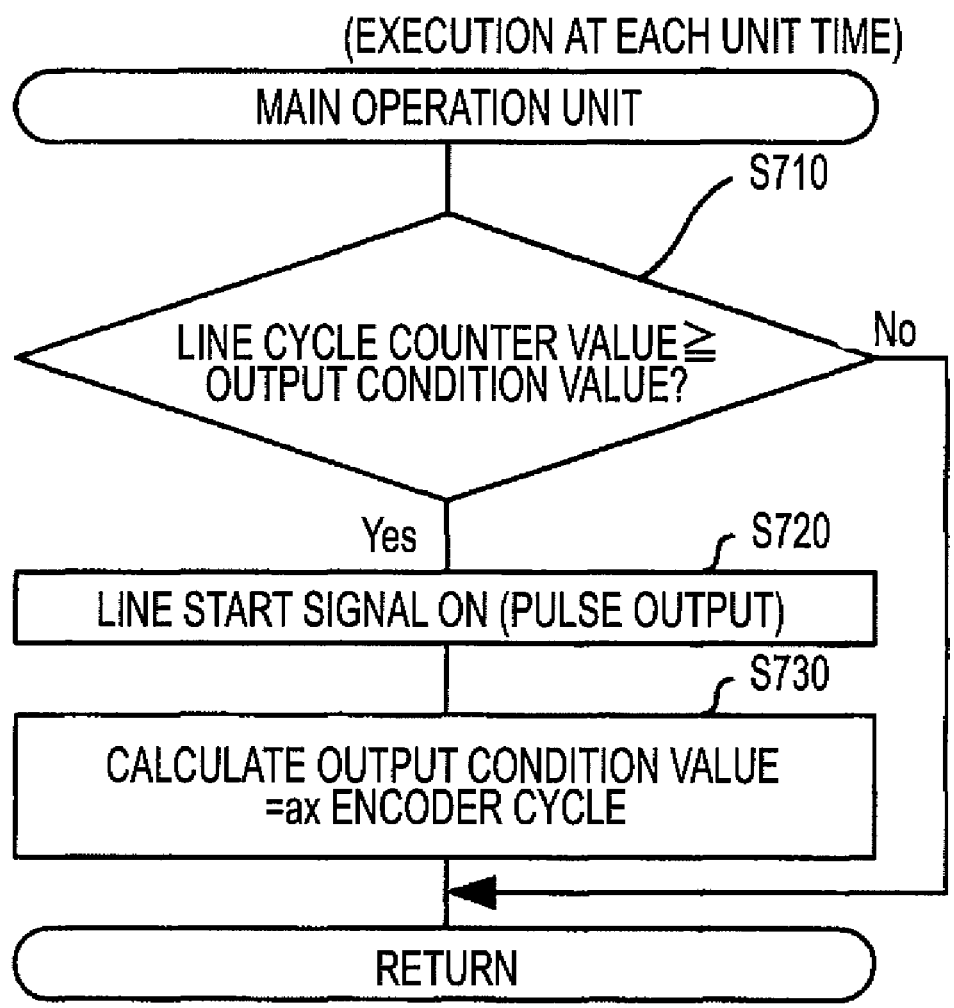
FIG. 12 is a flowchart illustrating processes performed by a main operation unit 415 according to a second modified embodiment.

Subsequently, a second modified embodiment will be described. An image reading apparatus of the second modified embodiment is configured by modifying the contents of the process performed by the main operation unit 415 in the image reading apparatus 1 of the embodiment described from Chapter (1) to Chapter (4). Hereinafter, as the description of the second modified embodiment, the contents of the process performed by the main operation unit 415 will be selectively described. FIG. 12 is a flowchart illustrating the process performed by the main operation unit 415 in the second modified embodiment.

In the second modified embodiment, the main operation unit 415 sets the cycle storing unit 27 as a referential spot in the same manner as the above-described embodiment, and repeatedly performs the process shown in FIG. 12 at each unit time on the basis of the clock signal output from the clock signal generator (not shown).

That is, the main operation unit 415 compares the count value LCYC represented by the line cycle counter 413 with a preset output condition value (S710). When the counter value LCYC is less than the output condition value (S710: No), the line start signal is not output. When the count value LCYC is equal to or greater than the output condition value (S710: Yes), the line start signal is output and transmitted to the line sensor 60 (S720). At the time of outputting the line start signal, on the basis of the encoder cycle represented at the time point of outputting the line start signal by the cycle storing unit 27, the value obtained by multiplying the encoder cycle by the correction coefficient $\alpha$ is set as a new output condition value (S730).

As described above, in the second modified embodiment, the output condition value is set at the time of outputting the line start signal. Then, the output condition value is kept to be fixed until the next line start signal is output. The next line start signal is output when the count value LCYC of the line cycle counter 413 is equal to or greater than the output condition value.

Figure 13:
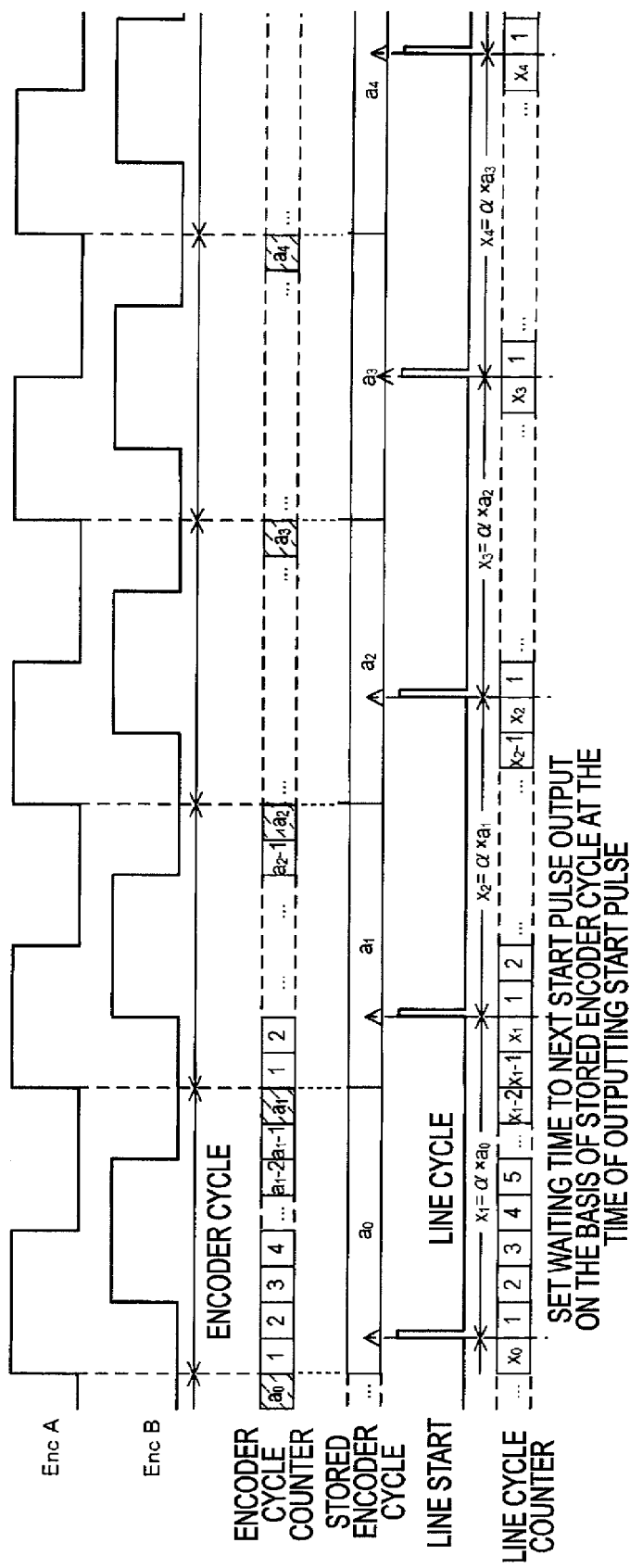
FIG. 13 is a time chart illustrating an output aspect of a line start signal according to the second modified embodiment.

FIG. 13 is a time chart illustrating a correspondence relationship of the line start signal output by the main operation unit 415 of the second modified embodiment, the output signals of the encoders EN1 and EN2, the count value ECYC of the encoder cycle counter 25, the encoder cycle stored in the cycle storing unit 27, and the counter value LCYC of the line cycle counter 413.

Even when the output condition value is set as described above and the output control of the line start signal is performed, it is possible to obtain the same advantages as those of the above-described embodiment. However, the updating cycle of the output condition value is delayed as compared with that of the above-described embodiment. Accordingly, in a circumstance where sudden variation in velocity may occur, it is preferable to update the output condition value at each unit time as descried in the above-described embodiment.

In S710, it is determined whether or not the conditional expression of counter value LCYC≧output condition value is satisfied. In the embodiment, there is no case where the conditional expression of counter value LCYC>output condition value is satisfied. Accordingly, when it is secured that the conditional expression of counter value LCYC>output condition value is not satisfied, Step S710 may be replaced by a step of determining whether or not the conditional expression of counter value LCYC=output condition value is satisfied.

(7) Others

The embodiments of the invention have been described, but the invention is not limited to the embodiments and may employ various aspects.

Figure 14:
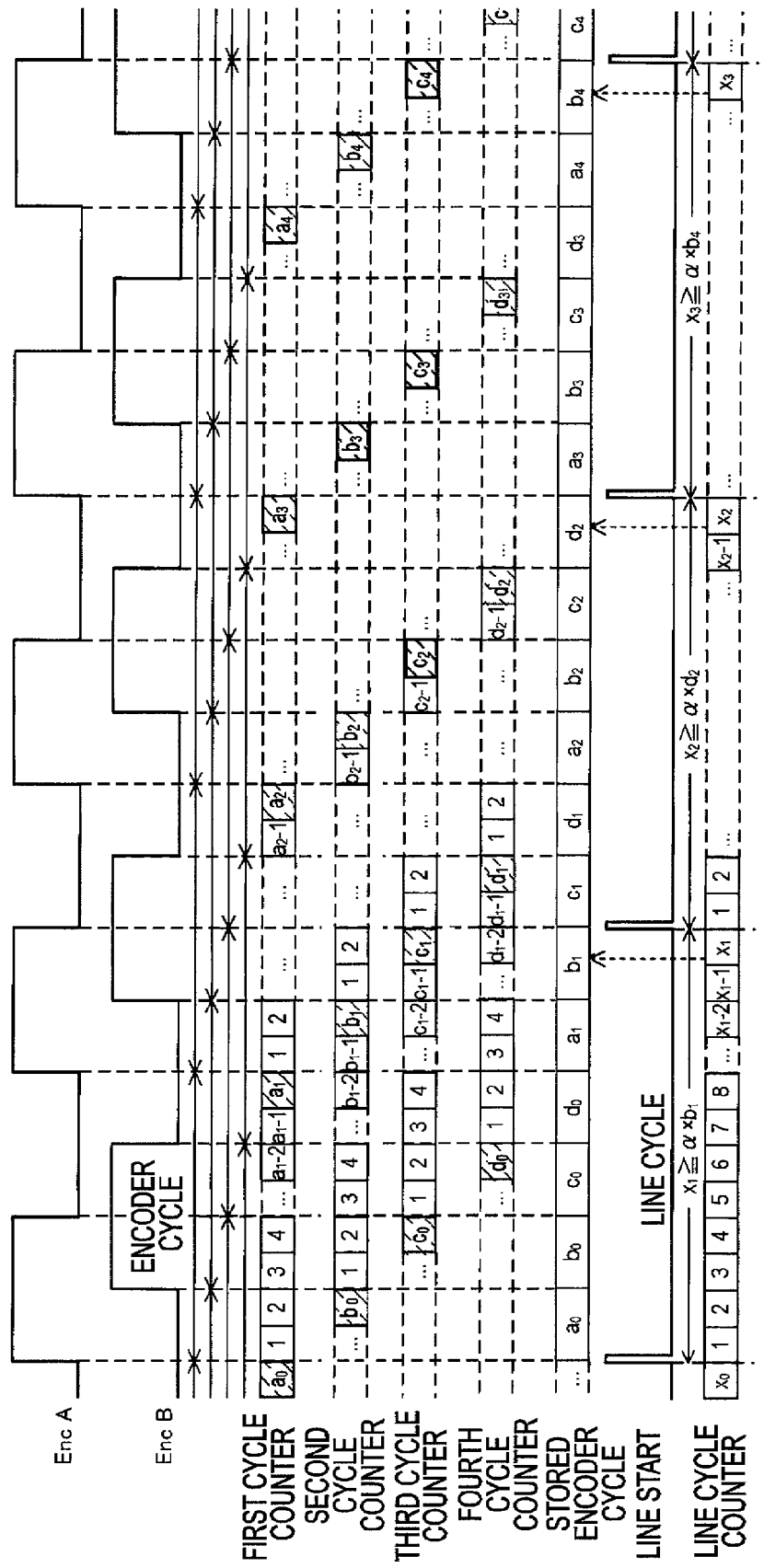
FIG. 14 is a time chart in an example of using four encoder cycle counters 25.

For example, the encoder processing unit 20 may be provided with four encoder cycle counters 25, and the encoder edge detecting unit 21 may detect a rising edge and a falling edge for each of the A-phase signal and B-phase signal and output the edge detection signals (see FIG. 14).

That is, in the total four encoder cycle counter 25, the first cycle counter may measure the time interval between the A-phase rising edges and may update the encoder cycle stored in the cycle storing unit 27 at the rising edge time of the A-phase signal, the second cycle counter may measure the time interval between the B-phase rising edges and may update the encoder cycle stored in the cycle storing unit 27 at the rising edge time of the B-phase signal, the third cycle counter may measure the time interval between the A-phase falling edges and may update the encoder cycle stored in the cycle storing unit 27 at the falling edge time of the A-phase signal, and the fourth cycle counter may measure the time interval between the B-phase falling edges and may update the encoder cycle stored in the cycle storing unit 27 at the falling edge time of the B-phase signal.

FIG. 14 is a time chart illustrating a correspondence relationship of the output signals of the encoders EN1 and EN2, the count value of the encoder cycle counter 25, the encoder cycle stored in the cycle storing unit 27, the line start signal, and the count value of the line cycle counter 413.

As described above, when the encoder cycle stored in the cycle storing unit 27 is updated, it is possible to further suppress the time lag between the encoder cycle stored in the cycle storing unit 27 and the actual velocity of the transport target as compared with the image reading apparatus 1 described above. Accordingly, it is possible to transmit the line start signal to the line sensor 60 at the further appropriate time. Therefore, when the encoder cycle is updated as described above, the image quality of the read image data is improved.

In the embodiment, the example of using the rotary encoders as the encoders EN1 and EN2 has been described, but a linear encoder may be employed as the encoder EN1.

What is claimed is:

1. An image reading apparatus comprising:
   a reading unit that performs a reading operation whenever a line start signal is input thereto, to read a reading target document line by line in a main scanning direction;
   a transport unit that transports any one of the reading unit and the reading target document as a transport target in a sub-scanning direction;
   an encoder that outputs an encoder signal whenever the transport target is moved by a predetermined distance;
   a control unit that transmits the line start signal to the reading unit;
   a time measuring unit that measures a time elapsed from a time point when the line start signal was last transmitted;
   a cycle measuring unit that measures an output time interval of the encoder signal output from the encoder, as an encoder cycle; and
   a storage unit that stores the latest encoder cycle measured by the cycle measuring unit,
   wherein
   the control unit transmits the line start signal to the reading unit whenever the elapsed time measured by the time measuring unit is equal to or greater than a time obtained by multiplying a value of the encoder cycle stored in the storage unit by a correction coefficient, the correction coefficient being determined by a ratio R2/R1 of a reading resolution R1 that is the number of reading lines per unit length in the sub-scanning direction and an encoder resolution R2 that is the number of outputs of encoder signals per unit length in the sub-scanning direction, the encoder resolution R2 corresponding to a reciprocal of the predetermined distance.

2. The image reading apparatus according to claim 1, wherein
   the control unit transmits the line start signal to the reading unit whenever the elapsed time measured by the time measuring unit is equal to or greater than a time obtained by multiplying a value of the encoder cycle by the correction coefficient, the value being obtained by referring to the encoder cycle stored in the storage unit at a time interval shorter than a transmit time interval of the line start signal.

3. The image reading apparatus according to claim 1, wherein
   the control unit sets, as a waiting time, a time obtained by multiplying the encoder cycle, which is stored in the storage unit at a time point when the line start signal was transmitted, by the correction coefficient whenever the line start signal is transmitted to the reading unit, and transmits the line start signal to the reading unit when the elapsed time measured by the time measuring unit is equal to or greater than the waiting time.

4. The image reading apparatus according to claim 1, further comprising:
   an output count unit that counts the number of encoder outputs that is the number of encoder signals output by the encoder;
   a line number count unit that counts the number of lines in which the reading operation is performed by the reading unit; and
   an excessive input determining unit that determines whether or not an input of a new line start signal to the reading unit is an excessive input based on the number of lines counted by the line number count unit and the number of encoder outputs counted by the output count unit,
   wherein
   when the excessive input determining unit determines that the input of the new line start signal is the excessive input, the control unit stops transmitting the line start signal to the reading unit.

5. The image reading apparatus according to claim 4, wherein
   the excessive input determining unit determines whether or not the input of the new line start signal to the reading unit is the excessive input, by determining whether or not the number of encoder outputs counted by the output count unit from a start time of the reading operation of the leading line performed by the reading unit is less than the value obtained by multiplying the number of lines counted by the line number count unit by the correction coefficient.

* * * * *